(12) United States Patent
Shotey et al.

(10) Patent No.: US 7,304,237 B1
(45) Date of Patent: Dec. 4, 2007

(54) HORIZONTAL AND VERTICAL SLIDE-MOUNTABLE ELECTRICAL DEVICE COVER

(75) Inventors: Michael J. Shotey, Las Vegas, NV (US); Marcus J. Shotey, Scottsdale, AZ (US); Lincoln Jolley, West Jordan, UT (US); Jeffrey P. Baldwin, Phoenix, AZ (US); George Lynn Hagen, Flagstaff, AZ (US); Richard L. Cleghorn, Tempe, AZ (US); Kenneth C. Booth, Mesa, AZ (US)

(73) Assignee: TayMac Corporation, Gilbert, AZ (US)

( * ) Notice: Subject to any disclaimer, the term of this patent is extended or adjusted under 35 U.S.C. 154(b) by 0 days.

(21) Appl. No.: 11/380,611

(22) Filed: Apr. 27, 2006

Related U.S. Application Data

(60) Provisional application No. 60/676,239, filed on Apr. 28, 2005.

(51) Int. Cl.
   *H02G 3/14* (2006.01)
(52) U.S. Cl. .......................... 174/66; 174/67; 220/241; 439/139
(58) Field of Classification Search .................. 174/66, 174/67, 58, 57; 220/241, 242; 439/165, 439/142, 136, 139, 144
See application file for complete search history.

(56) References Cited

U.S. PATENT DOCUMENTS

| 4,425,725 | A | * | 1/1984 | Moustakas et al. | ............ 40/725 |
| 5,280,135 | A | * | 1/1994 | Berlin et al. | .................. 174/67 |
| 5,763,831 | A | | 6/1998 | Shotey et al. | |
| 6,133,531 | A | * | 10/2000 | Hayduke et al. | ............... 174/67 |
| 6,441,307 | B1 | | 8/2002 | Shotey et al. | |
| 6,476,321 | B1 | | 11/2002 | Shotey et al. | |
| 6,891,104 | B2 | * | 5/2005 | Dinh | ........................... 174/67 |
| 6,979,777 | B2 | | 12/2005 | Marcou et al. | |

* cited by examiner

*Primary Examiner*—Dhiru R. Patel
(74) *Attorney, Agent, or Firm*—Booth Udall, PLC

(57) ABSTRACT

A simple, two piece slide-on electrical device cover assembly can be adapted for either horizontal or vertical mounting on the same base. Removable rail members that are coupled to the cover through thinned or partially broken or grooved sections enable the rail members to be snapped off under reasonable force. A manufacturer can package and ship a product in a generic configuration and allow an installer to select whether a horizontal or vertical configuration is desired, and quickly adapt and assembly the product for either configuration.

20 Claims, 20 Drawing Sheets

HORIZONTAL AND VERTICAL SLIDE-MOUNTABLE ELECTRICAL DEVICE COVER

BACKGROUND

1. Technical Field

Aspects of this document relate generally to slide-mountable small electrical device covers, such as for use with electrical outlets and switches. More specific implementations involve flat or while-in-use covers with removable rail members or angled rail members for configuration as either horizontal or vertical use orientation covers using the same assembly.

2. Background Art

Horizontal and vertical mountable electrical device cover assemblies using hinges are known in the art. Some examples of these assemblies are shown and described in U.S. Pat. Nos. 5,763,831 to Shotey et al. (issued Jun. 9, 1998) titled "Universal Cover Plate, Cover Plate Assembly, and Related Methods," 6,133,531 to Hayduke et al. (issued Oct. 17, 2000) titled "Weatherproof Outlet Cover," 6,441,307 to Shotey et al. (issued Aug. 27, 2002) titled "Universal Cover Plate," 6,476,321 to Shotey et al. (issued Nov. 5, 2002) titled "Horizontal and Vertical Mountable Weatherproof Cover Plate," and 6,979,777 to Marcou et al. (issued Dec. 27, 2005) titled "Weatherproof Electrical Enclosure Having an Adjustable-Position Cover," and U.S. patent application Ser. No. 11/056,835 to Shotey et al. (filed Feb. 11, 2005) titled "Weatherproof Receptacle Cover with Adapter Plate," the disclosures of each of which are hereby incorporated herein by reference for their general relevance to the formation and manufacture of cover assemblies. Such assemblies are conventionally made of plastic or metal, may be converted for use with removable portions to adapt the electrical device openings of the base for use with many different types of electrical devices using the same components, and may incorporate spring biased hinge members to enable use in both horizontal and vertical orientations using the same assemblies. Each of these assemblies, however, uses hinge members on the respective cover and base to allow for hinged coupling of the cover to the base.

Other references disclose single orientation sliding covers. For situations where a sliding cover is desirable, the ability to have a single assembly that could be adapted to horizontal and vertical use would be advantageous and reduce the inventory required by stores and installers.

SUMMARY

In one aspect, this document features a slide-on cover assembly for an electrical device that allows the device to be mounted horizontally or vertically with the same assembly. Various implementations include implementations dedicated for either horizontal or vertical orientation use, implementations having removable rail member portions that can be configured by an installer for either horizontal or vertical orientation use, flat cover implementations, while-in-use (or bubble) cover implementations, implementations with cord releases, and implementations with sliding rail members angled diagonally across the assembly. With only a two-part cover assembly, a horizontal and vertical slide-mountable may be formed from plastic or metal using conventional plastic and metal fabrication methods.

Specifically, each of the cover assemblies includes a cover and a base. It should be clear from the disclosure herein that although the specific implementations show the base configured for use with a duplex electrical outlet, it may alternatively be configured, directly or through the use of removable tabs or adapter plates, for use with a different electrical device such as, and without limitation, an electrical switch, a GFCI outlet, a round outlet, an electrical cable, multiple electrical devices, and the like. Covers and bases configured according to the implementations disclosed may be formed of metal or non-metal, such as plastic or resin depending upon the use for the particular cover assembly.

For particular implementations, a base includes two pairs of parallel rail members on opposing sides of a generally rectangular base and cover for the assembly so that each side of the assembly includes a rail member. Rail members along two adjacent sides of the assembly are made removable through grooves such that removal of a rail member along one side of the cover or base adapts the assembly for horizontal use orientation and removal of the rail member along another side adapts the assembly for vertical use orientation. Slidable engagement of the remaining cover and base rail members couples the cover to the base in the desired orientation. The rail members may be parallel to the plane of the base, or angled in relation to the plane of the base.

For other particular implementations, a horizontal and vertical mountable electrical device cover assembly includes a base and a cover with an opposing pair of parallel rail members extending across the assembly (across each of the base and the cover) at an angle of between about 40 and about 50 degrees relative to its mounting orientation. By engaging the rail members of the base with the rail members of the cover, the cover slides diagonally across the surface of the base to open and close the assembly in either the horizontal or vertical use orientation. A spring-biased bubble cover implementation provides additional assurance that the lid will close.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations are not limited to the specific components or assembly procedures disclosed herein. Many additional components and assembly procedures known in the art consistent with the intended cover assembly and/or assembly procedures for a cover assembly will become apparent for use with implementations of horizontal and vertical electrical device cover assemblies from this disclosure. Accordingly, for example, although particular hardware is disclosed, such hardware and implementing components may comprise any shape, size, style, type, model, version, measurement, concentration, material, quantity, and/or the like as is known in the art for such hardware and implementing components, consistent with the intended operation of a horizontal and vertical electrical device cover assembly.

Figure 1:
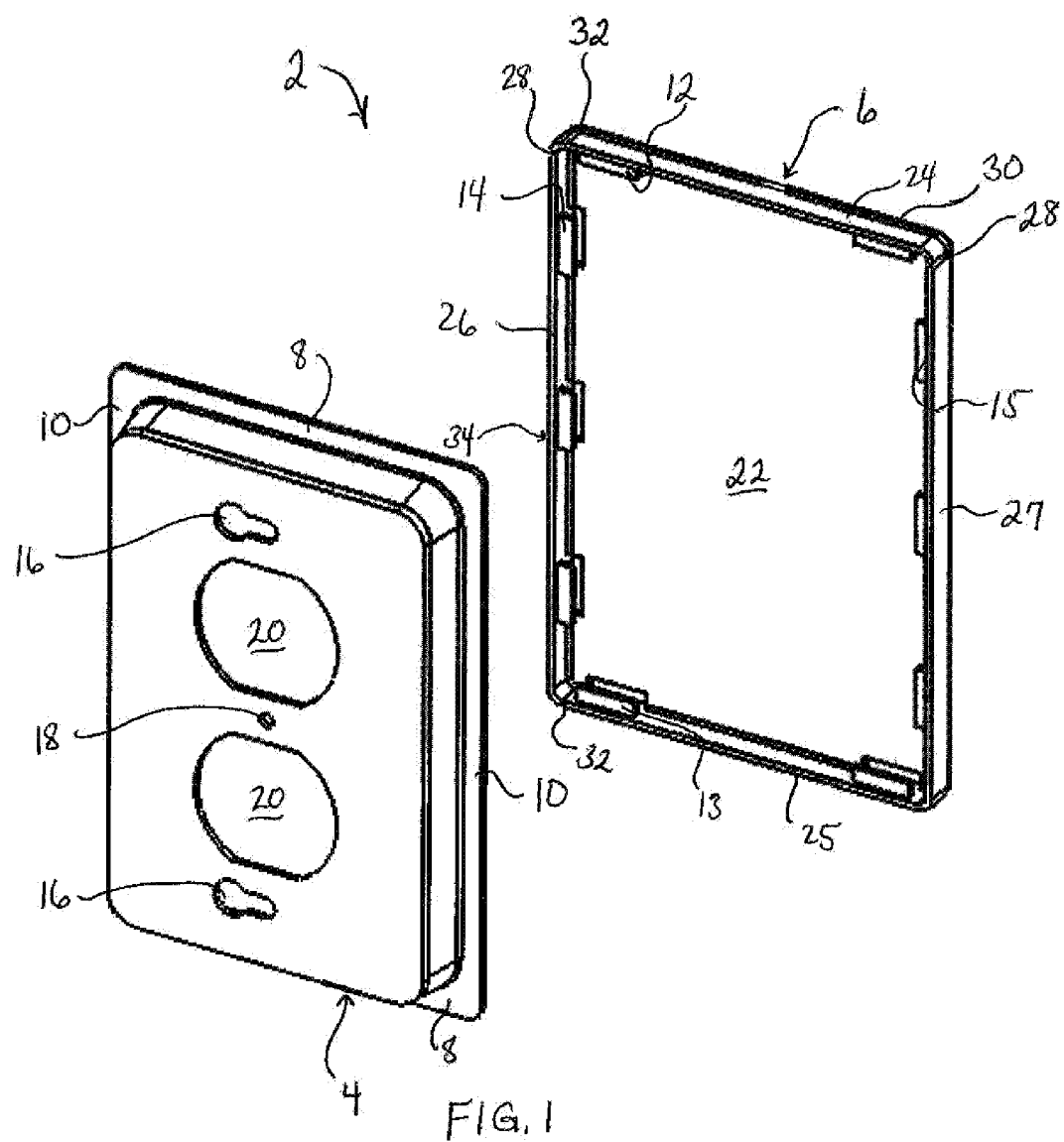
FIG. 1 is a perspective view of an electrical device cover assembly including a base and a cover.

FIG. 1 is a perspective view of an electrical device cover assembly 2 including a base 4 and a cover 6. The base of this particular implementation includes, in the form of ridges, rail members 8 extending along two of its sides, and rail members 10 extending along its other two sides. These rail members 8 and 10 act in concert with rail members 12-15 of the cover 6 to cause the cover 6 to slide in relation to the base 4 in a direction substantially planar to both the plane of the cover 6 and the front of the base 4.

The base 4 includes mounting screw openings 16 and 18 and electrical device openings 20. As explained above, and examples of which were incorporated by reference, the electrical device openings may be configured in many different configurations including, but not limited to, differently shaped openings, openings with removable tabs for adapting the openings to a variety of electrical device shapes and sizes, and/or adapter plates.

Figure 2:
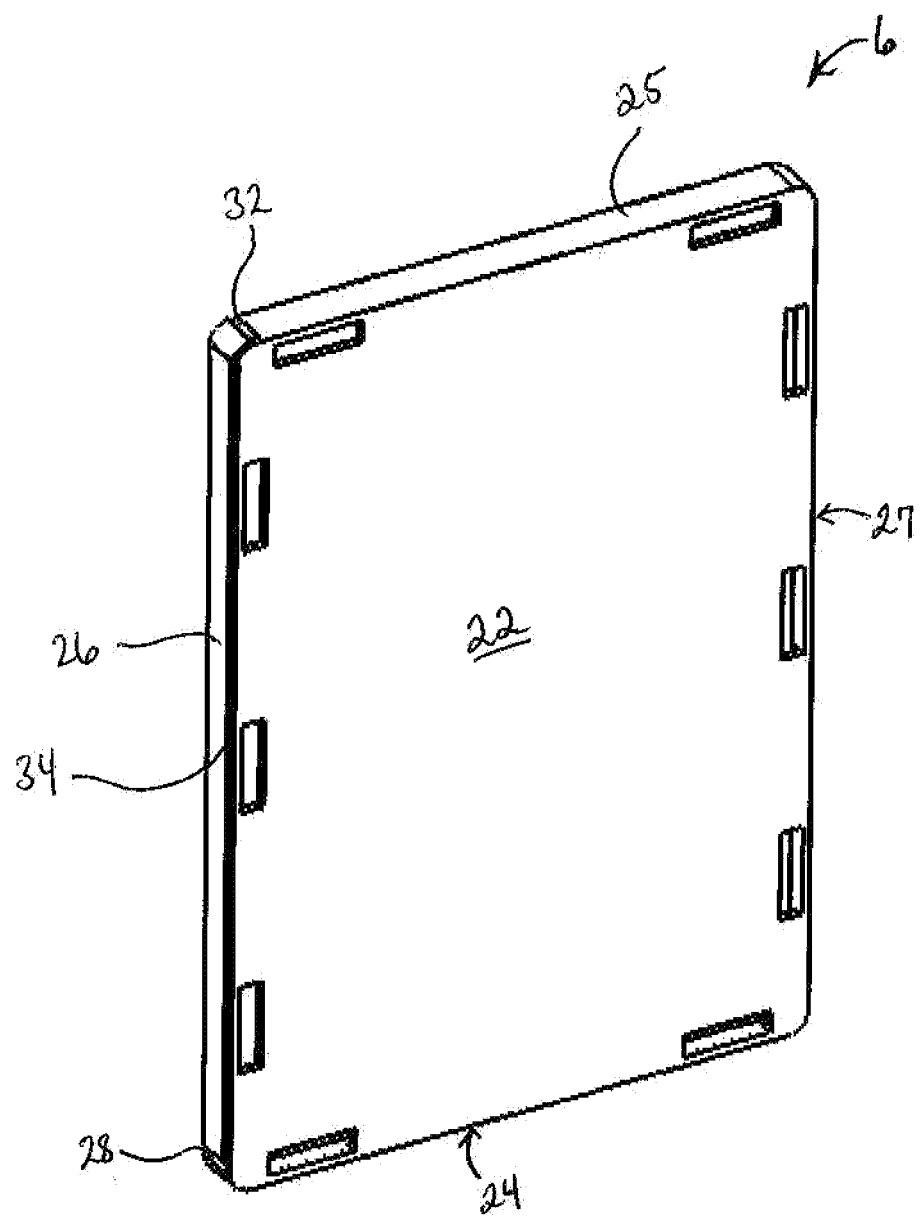
FIG. 2 is perspective view of a front side of an electrical device cover.

The cover 6 of this implementation (also illustrated in FIG. 2) includes a generally planar surface 22 and four walls 24-27 extending outwardly therefrom. At least two of the walls on adjacent sides, in this implementation walls 24 and 26, are configured having grooves 28 and 30, and 32 and 34. The grooves 28, 30, 32 and 34 enable the walls 24 or 26 to be selectively removed from the cover 6 through prying. Groves used for attaching removable components, such as removable tabs for varied electrical device styles, are known in the art. It is contemplated that the groove will have a depth of 40%-60% of the total wall depth, though greater and lesser depths are also contemplated up to 80% of the wall depth with greater and lesser ease in breaking the walls 24 or 26 from the cover 6. Through removal of the walls 24 or 26, the corresponding rail members 12 or 14 are also removed.

In particular implementations, it is contemplated that rather than a particular wall being removed, the rail members themselves may be removed through grooved attachments. In other particular implementations, the walls 24 or 26 may be selectively coupled to the cover 6 (or the base 4 if the implementation involves the removable rail members on the base 4) for either horizontal or vertical orientation use. In such an implementation, two of the cover walls 25 and 27 could be permanently attached to the cover 6 and an installer could select whether to attach wall 24 or 26 through a connector, such as a pronged connector into an opening in the cover surface 22. Although the rail members of the various implementations may be implemented as a particular style of rail, for example a ridge rail members and slot rail members as in FIG. 1, other rail member designs are also contemplated and equivalent to the presently disclosed designs and may be equivalently interchanged for the designs shown and described herein. Additional optional cover slide stops may be included to restrict movement of the cover beyond a certain point in the vertical and/or the horizontal direction. Any of the methods and designs disclosed herein may be readily implemented in the various implementations illustrated throughout this disclosure.

Figure 3:
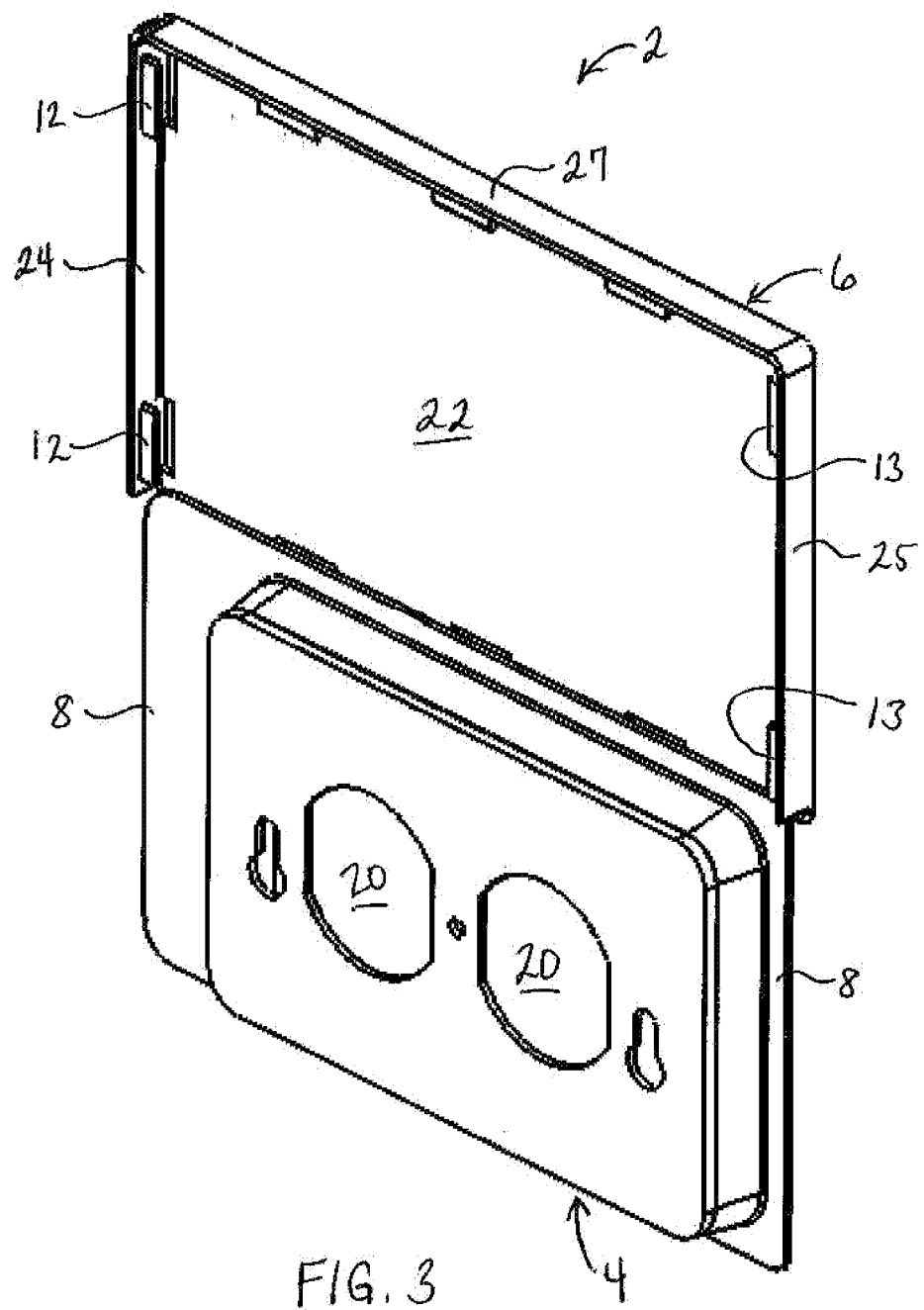
FIG. 3 is a perspective view of an electrical device cover assembly in an open position configured for horizontal orientation use.
Figure 4:
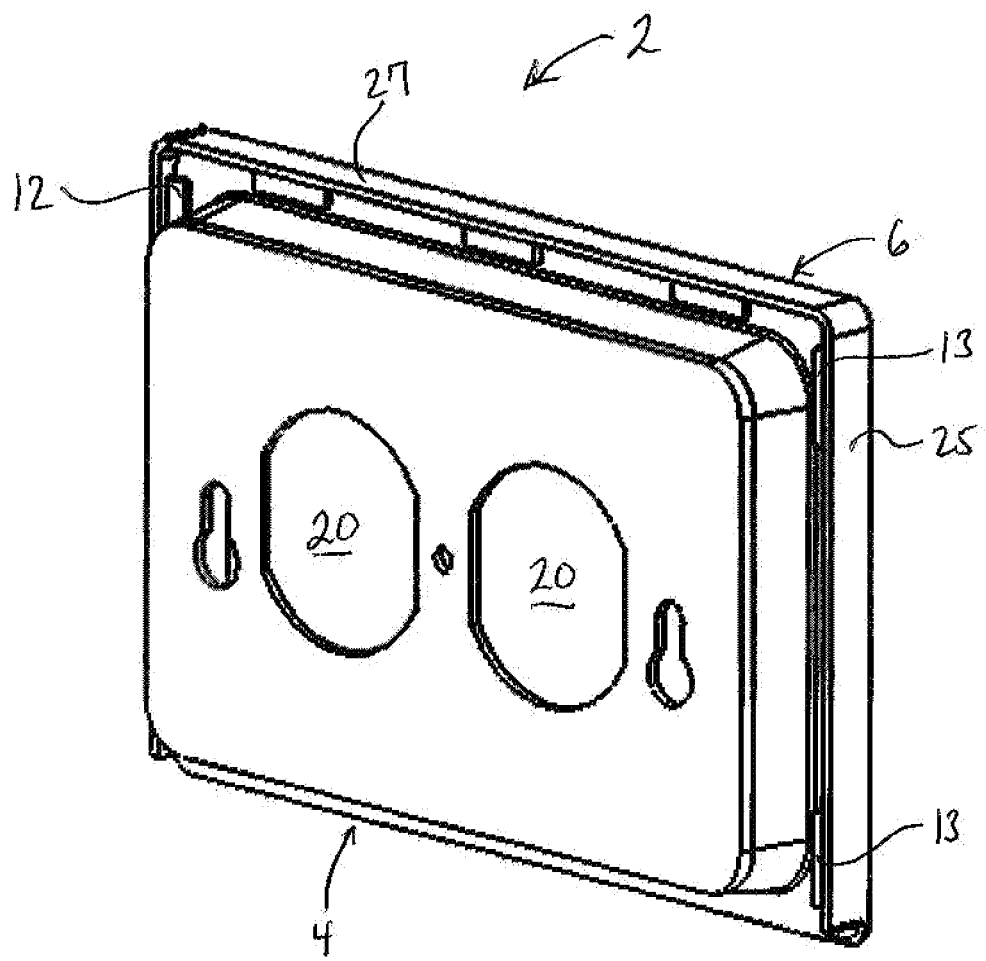
FIG. 4 is a perspective view of a back side of an electrical device cover assembly in a closed position configured for horizontal orientation use.
Figure 5:
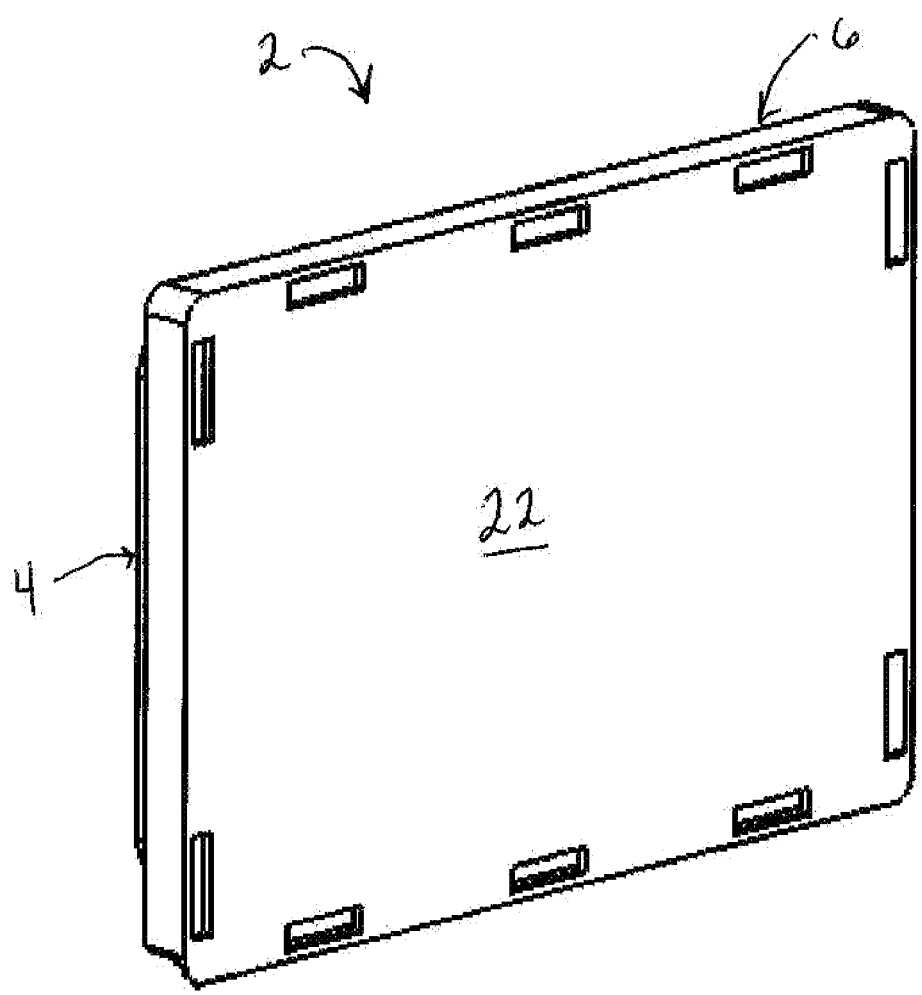
FIG. 5 is a perspective view of a front side of an electrical device cover assembly in a closed position configured for horizontal orientation use.

FIGS. 3, 4 and 5 illustrate an implementation of an electrical device cover assembly 2 illustrating the base 4 and cover 6 of FIG. 1 where the base 4 and cover 6 have been elongated slightly. Other than the slightly longer base, and cover to match, the design implemented is the same as that in FIG. 1. For the illustration in FIG. 3, the rail members 14 from FIG. 1 have been removed through removal of wall 26 from FIG. 1 by breaking the wall 26 from the cover 6 along grooves 32 and 34 of FIG. 1. With the wall removed, and the remaining walls 24 and 25 with their respective remaining rail members 12 and 13 acting as a rail system in conjunction with base rail members 8, the cover can now slidably engage the base for use in the horizontal orientation. In other words, when the rail members 14 are removed, the cover 6 may slide vertically on the base 4 when the base 4 is mounted with its electrical device openings 20 oriented horizontally. Vertical use orientation would involve the base 4 being mounted with the electrical device openings 20 oriented vertically. Horizontal and vertical orientation terminology for electrical device covers is conventional and well known in the industry.

The manufacture of metal and plastic components that slide in relation to each other is known in the art. For the purposes of the present disclosure, particular implementations are required by the electrical code to include a cover that closes against the base on its own. In such cases, less friction is desirable between the cover rail members and the base rail members so that the cover can close on its own under the force of gravity. Those of ordinary skill in the art will readily be able to design rail member components that cooperate to this end without excessive experimentation using general knowledge of components having sliding relationships.

Figure 6:
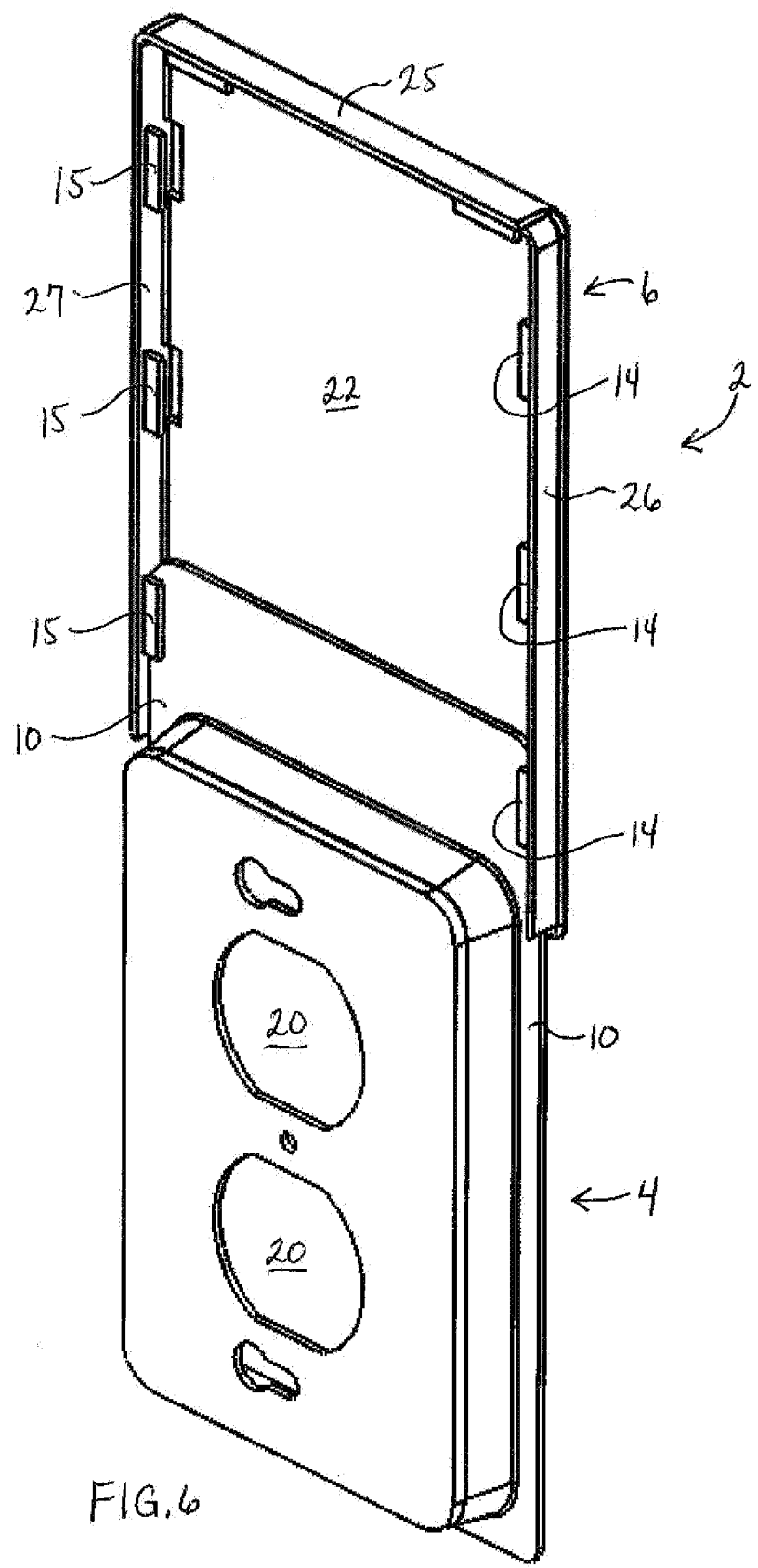
FIG. 6 is a perspective view of an electrical device cover assembly in an open position configured for vertical orientation use.
Figure 7:
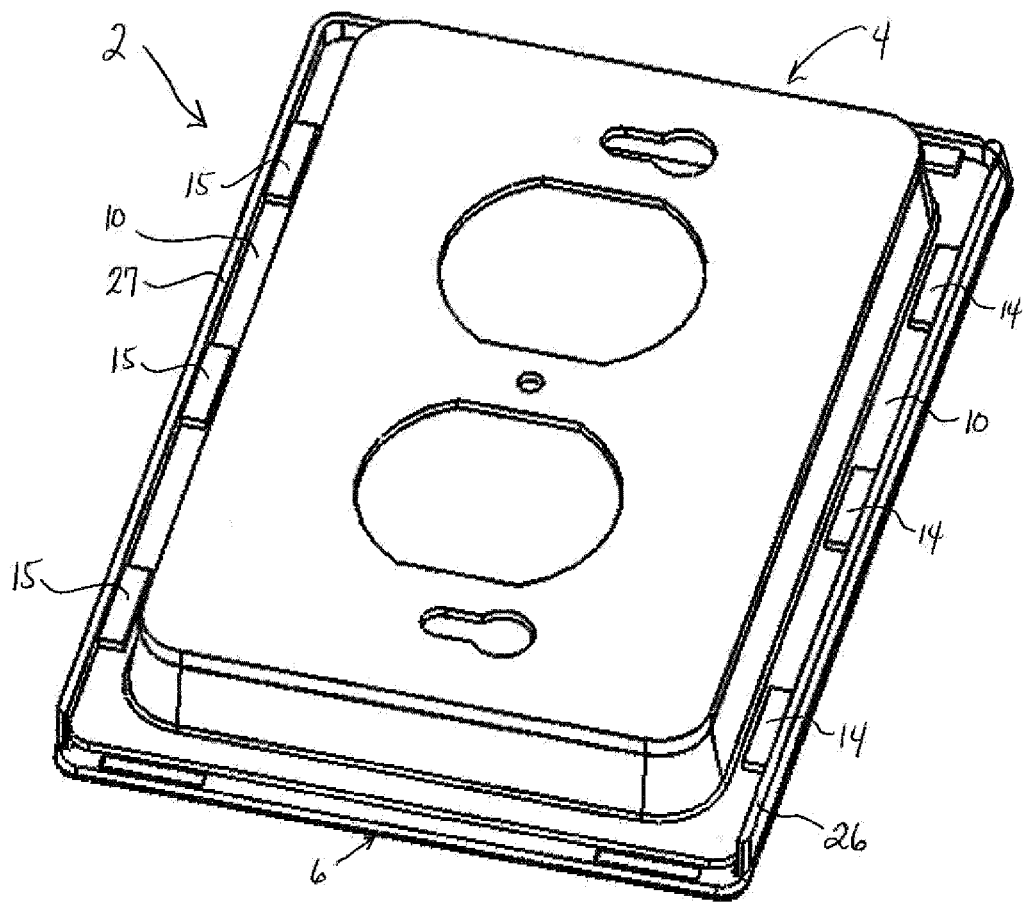
FIG. 7 is a perspective view of an electrical device cover assembly in a closed position configured for vertical orientation use.

FIGS. 6 and 7 illustrate an implementation of an electrical device cover assembly 2, like the one in FIG. 3, illustrating the base 4 and cover 6 of FIG. 1 where the base 4 and cover 6 have been elongated slightly, but with the rail members 12 from FIG. 1 removed through removal of wall 24 from FIG. 1. Wall 24 was removed from FIG. 1 by breaking the wall 24 from the cover 6 along grooves 28 and 30 of FIG. 1. With the wall 24 removed, and the remaining walls 26 and 27 with their respective remaining rail members 14 and 15 acting as a rail system in conjunction with base rail members 10, the cover can now slidably engage the base for use in the vertical orientation.

It should be clear from the present disclosure that although the removable rail members are implemented on the cover walls, they may just as easily be interchanged with the base so that the removable portions are associated with the base rather than the cover, or one of the removable portions could be implemented on the base and another portion could be implemented on the cover. From a review of the various implementations, configurations including these alternatives will become readily apparent.

Figure 8:
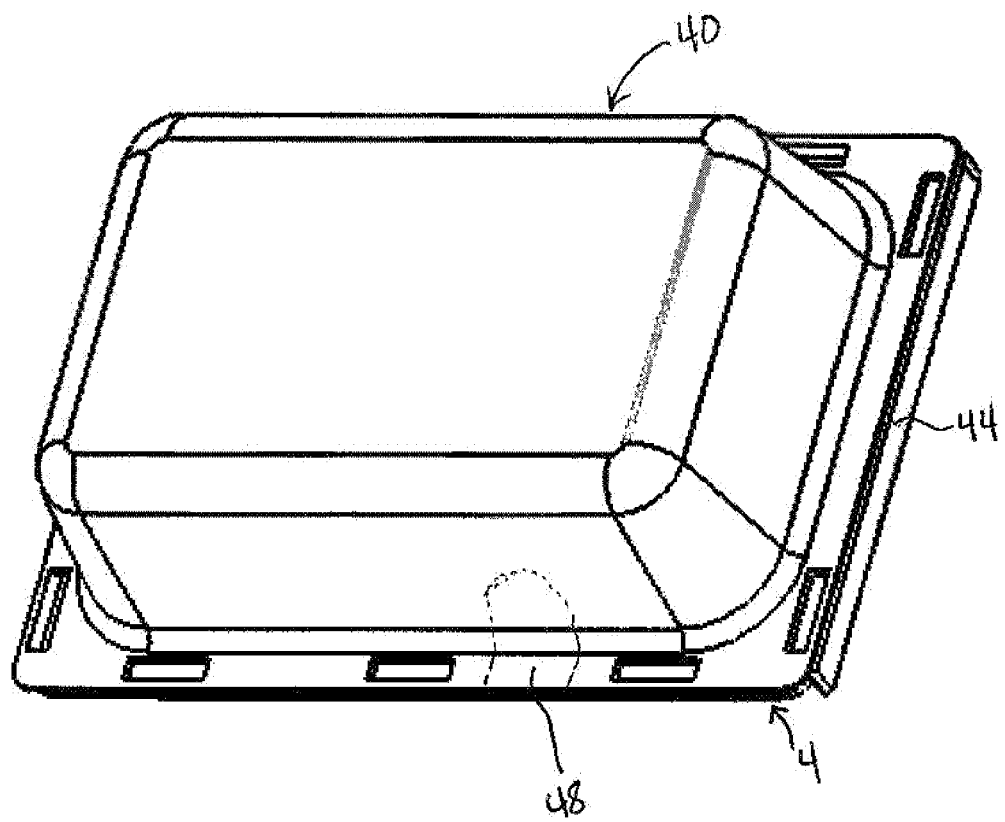
FIG. 8 is a perspective view of a while-in-use electrical device cover assembly in a closed position configured for horizontal orientation use.
Figure 9:
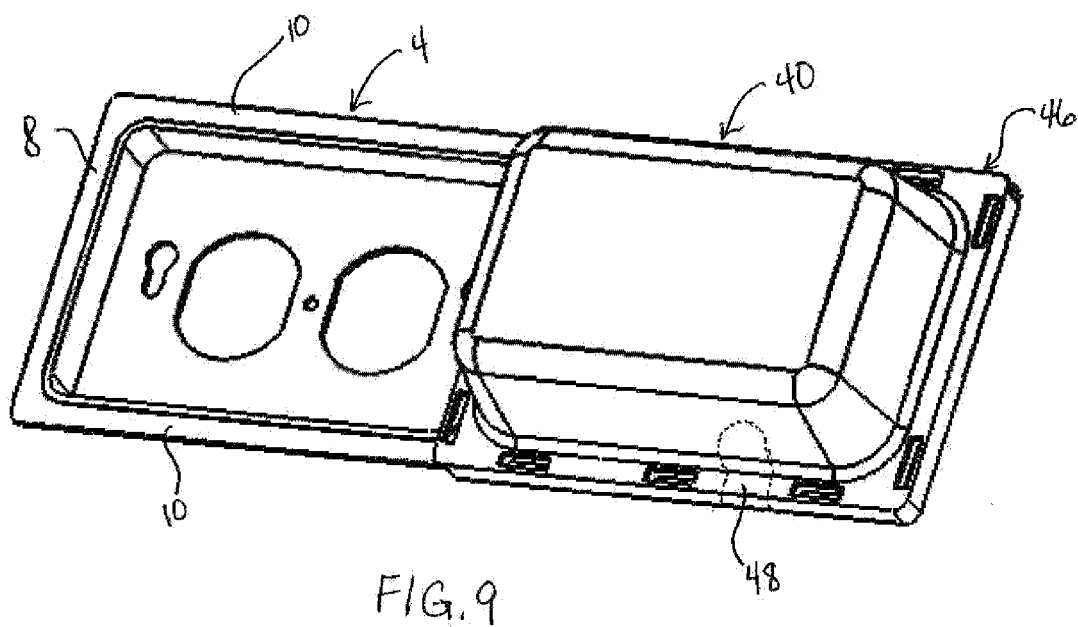
FIG. 9 is a perspective view of a while-in-use electrical device cover assembly in an open position configured for horizontal orientation use.

FIGS. 8 and 9 illustrate an implementation of a vertical and horizontal slide-mountable cover assembly including a while-in-use or "bubble" cover 40. The base 4 of this implementation is the same as the base 4 used in FIG. 1. The rail system of FIGS. 8 and 9 works the same as the rail system of FIG. 1. FIGS. 8 and 9 include removable rail members 44 and 46, removable along appropriately configured grooves. Selective removal of rail member 44 adapts the assembly for use in the vertical orientation and removal of rail member 46 adapts the assembly for use in the horizontal orientation. Distinct from the implementation of FIG. 1, the bubble cover 40 of FIGS. 8 and 9 includes removable cord escape tab 48 for horizontal orientation and another cord escape tab (not shown) for vertical orientation. The tab corresponding to the selected orientation would be removed and the cord could escape from the cover assembly when in a closed position.

Figure 10:
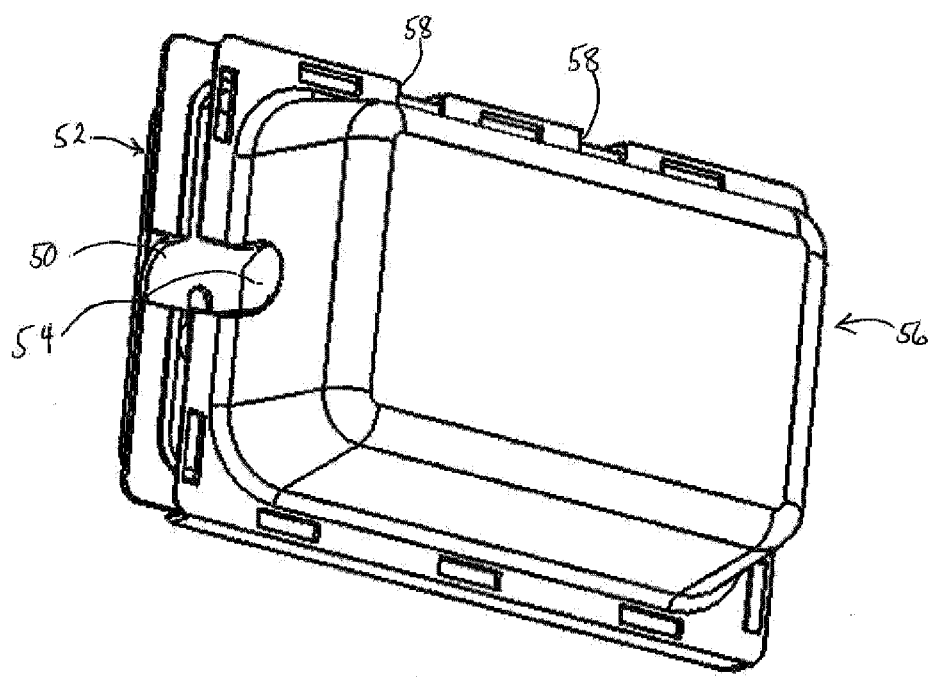
FIG. 10 is a perspective view of a second implementation of a while-in-use electrical device cover assembly in a closed position configured for horizontal orientation use.
Figure 11:
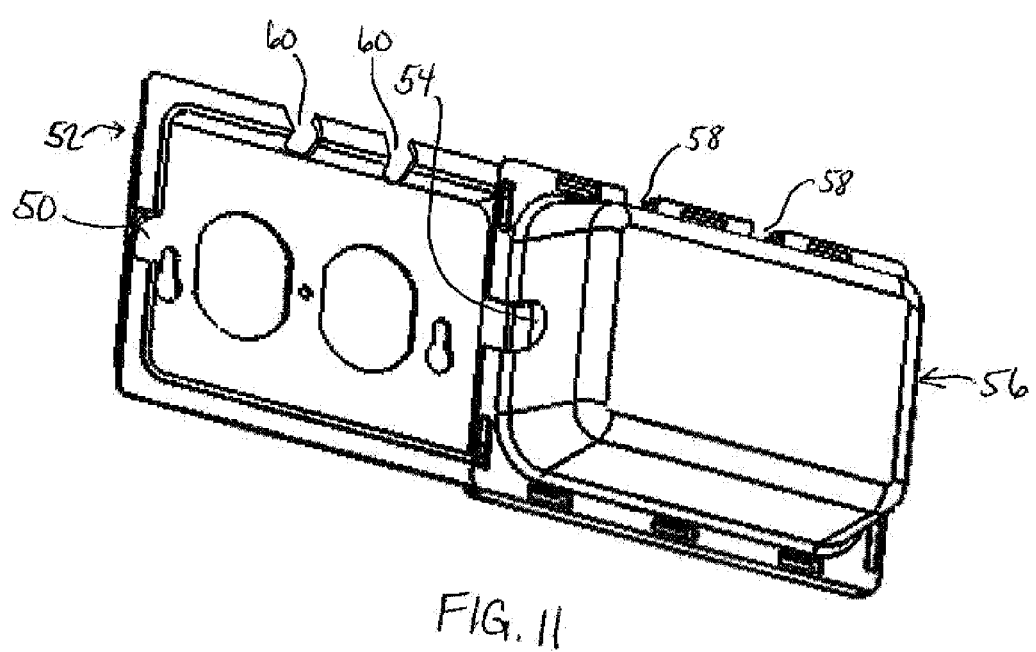
FIG. 11 is a perspective view of a second implementation of a while-in-use electrical device cover assembly in an open position configured for horizontal orientation use.

FIGS. 10 and 11 illustrate another implementation using a bubble cover. This implementation includes a cord escape 50 in the base 52, along a first side, and a cord escape 54 in the cover 56. Cord escapes 58 along a second side of the cover 56, and corresponding cord escapes 60 along the second side of the base 52 are included in this design. Like the design of each of the implementations discussed thus far, the rail members may be removed by selective removal of the corresponding wall for use in either a vertical or a horizontal orientation.

As mentioned briefly elsewhere in this disclosure, the rail members do not need to extend parallel to the plane of the top of the base. FIGS. 12-21 illustrate an implementation of a horizontal and vertical slide-mountable electrical device cover assembly where the rail members are at an angle with respect to the base and cover so that the movement of the cover is from an open position farther away from the base, to a closed position adjacent the base.

Figure 12:
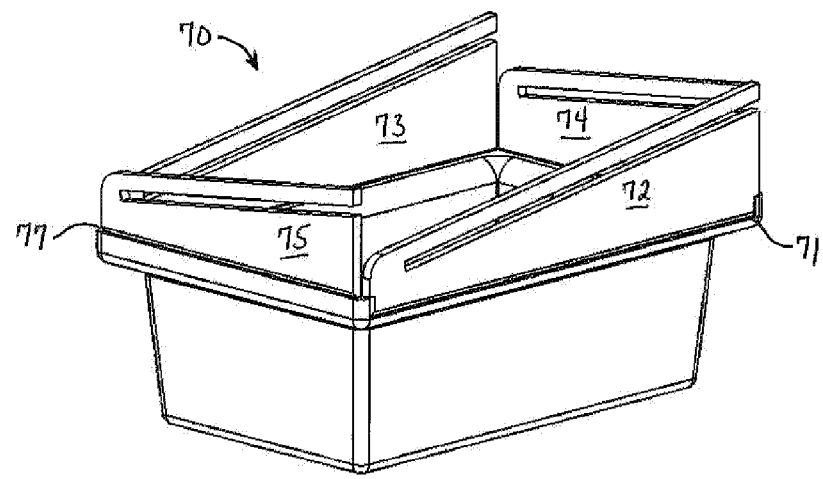
FIG. 12 is perspective view of an electrical device cover with angled rail members.

FIG. 12 is a perspective view of a cover 70 having a first pair of opposing rail members 72 and 73, and a second pair of opposing rail members 74 and 75. For this implementation, all four of the rail members 72, 73, 74 and 75 are removable from the base through grooves similar to the implementation shown in FIG. 1. For the rail members of this implementation, however, the rail members 72, 73, 74 and 75 include a track at an angle to the plane parallel to the top of the cover and to the plane parallel to the bottom of the base. Although the implementations shown in FIGS. 12-21 include a constant angle (i.e. the rail member track is a straight line), an arcuate angle (track that travels in a changing angle to form an arc) or other angle is also contemplated within the meaning of "angle." FIG. 13 illustrates the cover of FIG. 12 with opposing rail member pair 74 and 75 removed by breaking the rail members 74 and 75 from the cover along grooved connectors 77, leaving opposing rail member pair 72 and 73, for configuration of the cover 70 for use in a vertical orientation.

Figure 14:
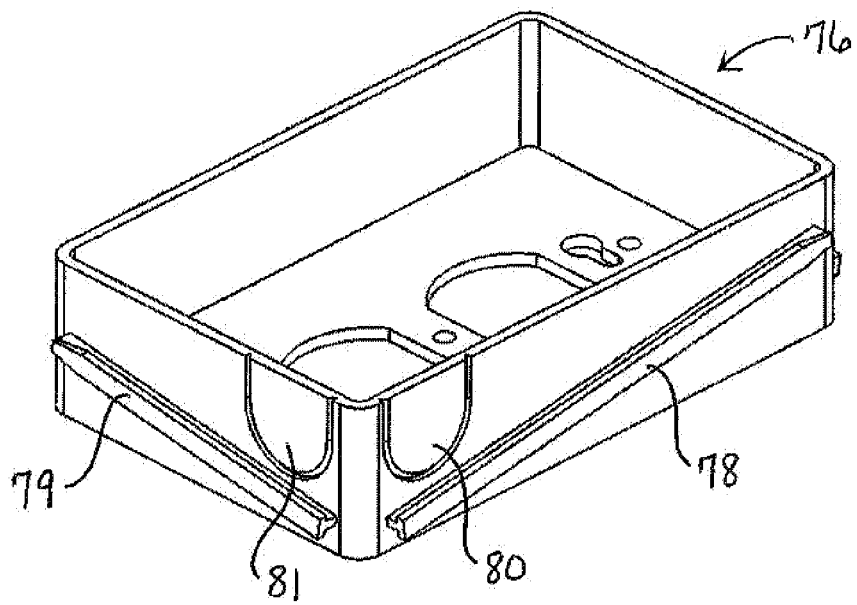
FIG. 14 is a perspective view of an electrical device cover assembly base with angled rails.

FIG. 14 illustrates a base 76 having angled rail member pair 78 extending along opposing long sides of the rectangular base 76 and angled rail member pair 79 extending along opposing short sides of the rectangular base 76. Cord escape tabs 80 and 81 are included near a bottom corner of the base 76 so that the base 76 may be further adapted for use in either its vertical or horizontal orientation and still include an appropriately configured cord escape opening.

Figure 13:
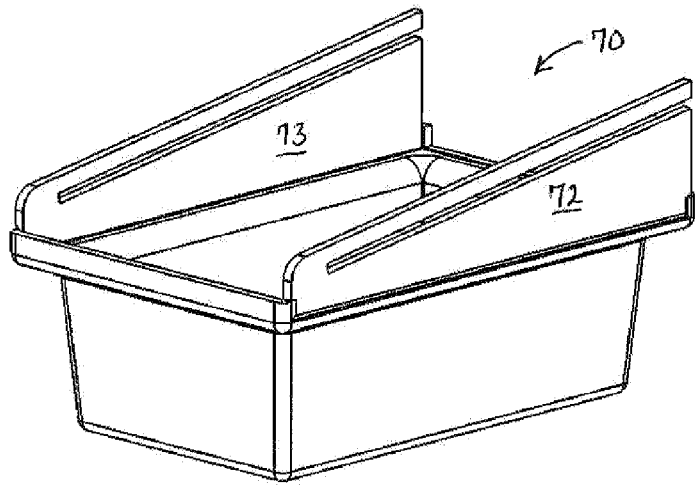
FIG. 13 is perspective view of the electrical device cover of FIG. 12 with angled rail members removed for vertical orientation use.
Figure 15:
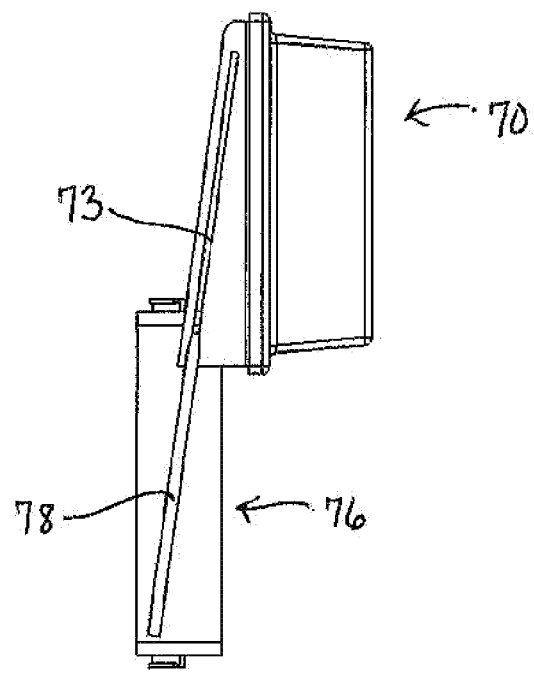
FIG. 15 is a side view of an electrical device cover assembly including the cover of FIG. 13 and the base of FIG. 14 assembled in an open position for vertical orientation use.
Figure 16:
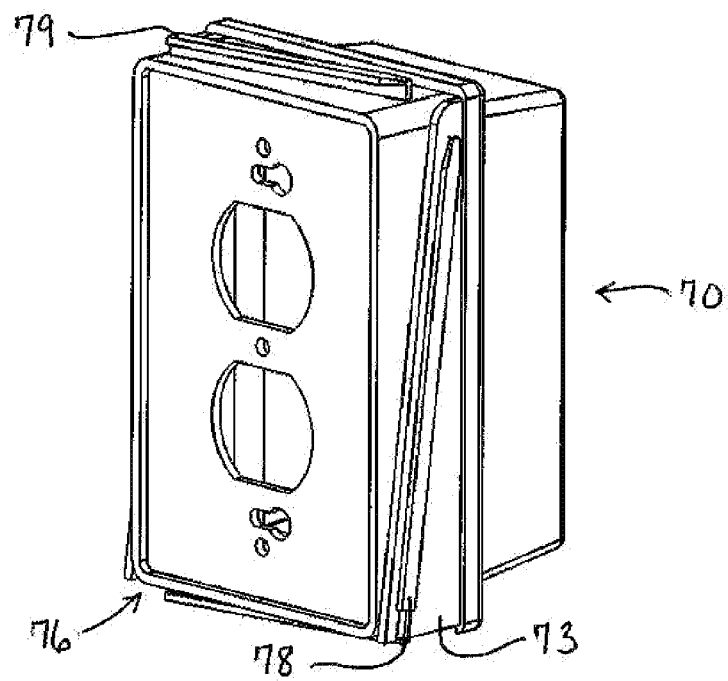
FIG. 16 is a rear perspective view of an electrical device cover assembly including the cover of FIG. 13 and the base of FIG. 14 assembled in a closed position for vertical orientation use.
Figure 17:
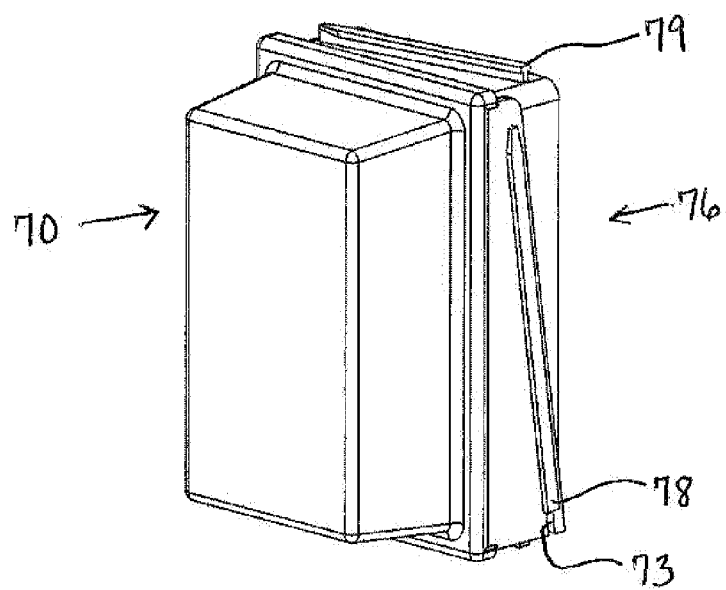
FIG. 17 is a front perspective view of an electrical device cover assembly including the cover of FIG. 13 and the base of FIG. 14 assembled in a closed position for vertical orientation use.

FIGS. 15, 16 and 17 illustrate the cover 70 and remaining rail pair 72 and 73 of FIG. 13, configured for use in the vertical orientation, slidably mounted to rail members 78 of the base 76 of FIG. 14. By including the rail members of both the cover and the base at matching angles relative to the plane defined by the back surface of the base 76, the cover 70 closes on the base 76 while remaining consistently parallel to the base. By slidably moving the cover 70 vertically away from the base 76, the cover assembly is able to be opened to access the electrical device within the assembly. By slidably moving the cover 70 vertically toward the base 76 and back toward the base 76 at an angle, the cover 70 seats against the base at the end of the sliding movement rather than sliding along the base 76 surface. In particular implementations of an electrical device cover assembly, a gasket is included around the lip of the base to enhance the weatherproofing characteristics of the assembly when it is in its closed position. By causing the cover 70 to slide toward the base 76 at an angle, it is possible to use a gasket in a slidably mounted cover assembly without prematurely wearing out the gasket from constant vertical wear against it.

Figure 18:
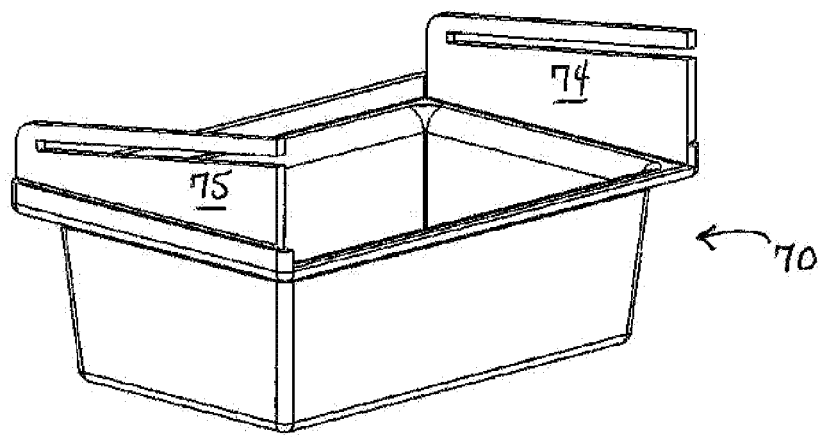
FIG. 18 is perspective view of the electrical device cover of FIG. 12 with angled rail members removed for horizontal orientation use.
Figure 19:
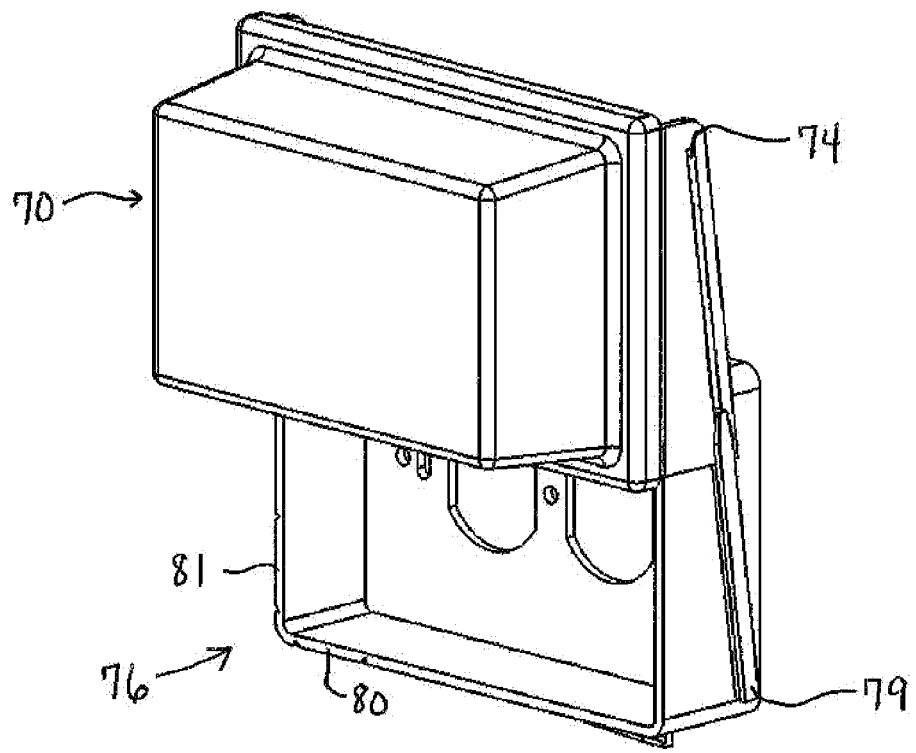
FIG. 19 is a front perspective view of an electrical device cover assembly including the cover of FIG. 18 and the base of FIG. 14 assembled in an open position for horizontal orientation use.
Figure 20:
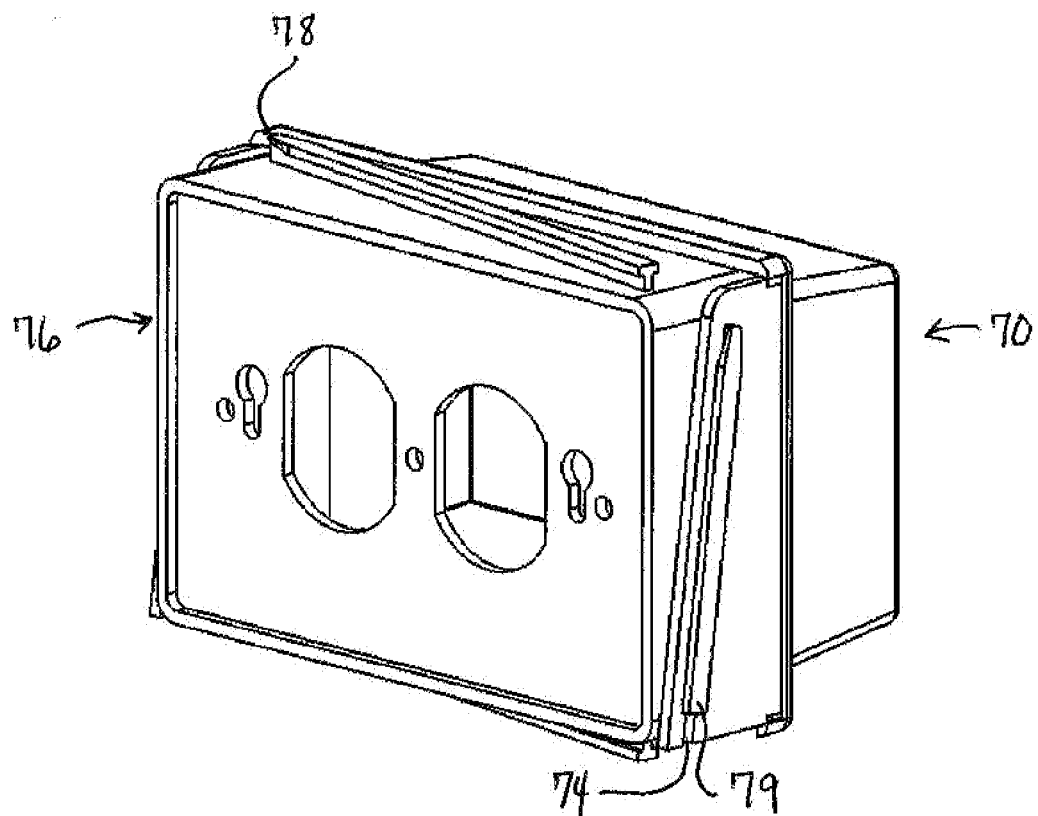
FIG. 20 is a rear perspective view of an electrical device cover assembly including the cover of FIG. 18 and the base of FIG. 14 assembled in a closed position for horizontal orientation use.
Figure 21:
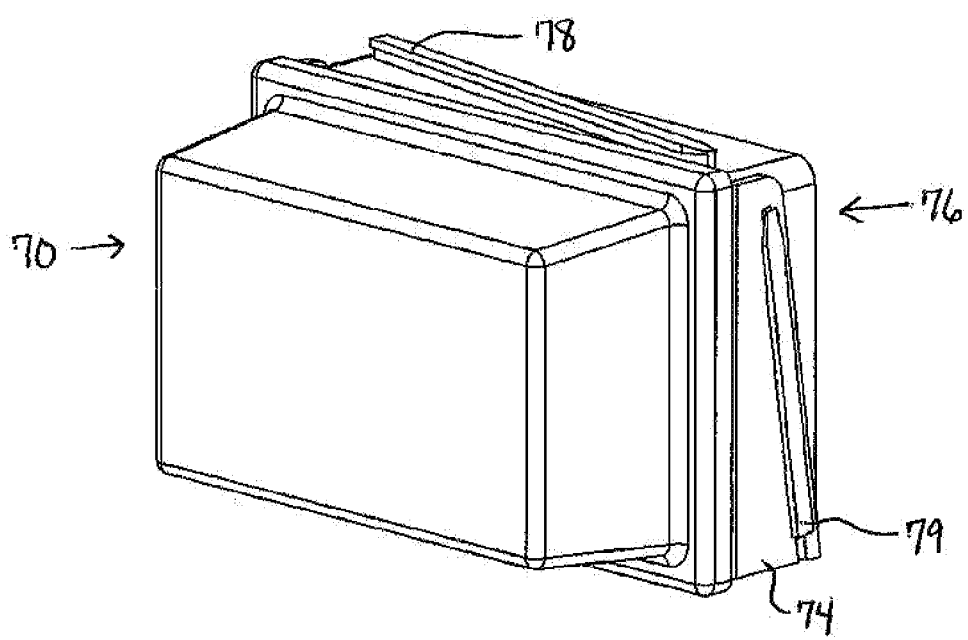
FIG. 21 is a front perspective view of the electrical device cover assembly of FIG. 20.

FIG. 18 illustrates the cover 70 of FIG. 12 with opposing rail member pair 72 and 73 removed by breaking the rail members 72 and 73 from the cover along grooved connectors 71, leaving opposing rail member pair 74 and 75, for configuration of the cover 70 for use in a horizontal orientation. FIGS. 19, 20 and 21 illustrate the cover 70 and remaining rail pair 74 and 75 of FIG. 13, configured for use in the horizontal orientation, slidably mounted to rail members 79 of the base 76 of FIG. 14.

Figure 22A:
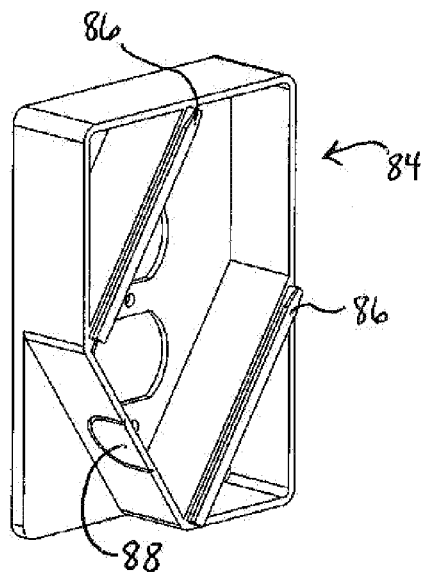
FIGS. 22a and 22b are, respectively, front and rear perspective views of an electrical device cover assembly base with angled rail members.
Figure 22B:
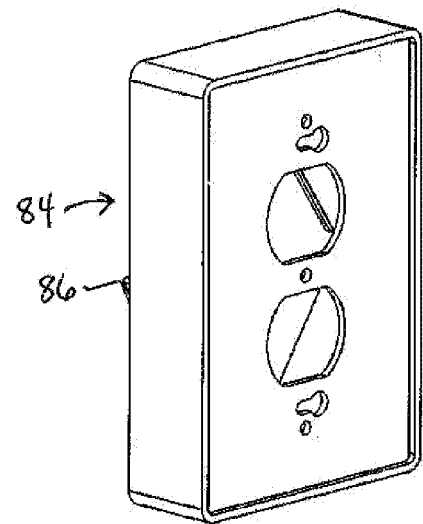

FIGS. 22a and 22b illustrate front and back perspective views of a base 84 of an electrical device cover assembly having angled rail members 86 extending across the face of the base 84. Cord escape tab 88 (or "knockout") is included between the rails on a wall of the base 84. The rail members 86 of this implementation are substantially parallel to the plane defined by the back surface of the base 84. This is also parallel to the plane of the support structure to which the base 84 will be mounted for use of the assembly. However, as shown in the implementation shown in FIGS. 12-21, there is no requirement that the rail members 86 be parallel to the base plane, and there are some advantages for particular implementations in having the rail members extend at an angle down toward the base plane because the cover may be able to seat more tightly against the base (wedged against it) and a gasket seal for the sliding cover may now be practical. Although protruding rail members 86 are shown on the base and recessed rail members 92 are shown on the cover (FIGS. 23a and 23b), these two structure types may equivalently be switched or interchanged so long as the corresponding rail member parts can slidably engage with each other.

Figure 23A:
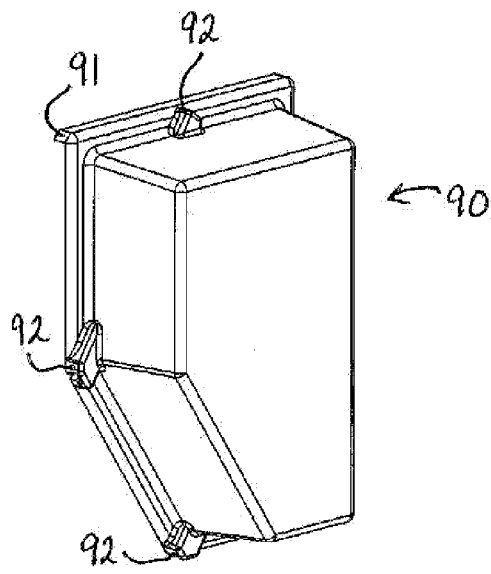
FIGS. 23a and 23b are, respectively, front and rear perspective views of an electrical device cover assembly cover with angled rail members.
Figure 23B:
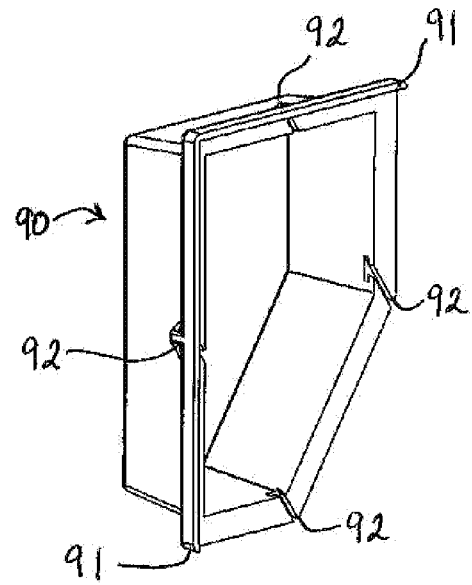

FIGS. 23a and 23b illustrate, respectively, front and back views of a cover 90 to match the base 84 shown in FIGS. 22a and 22b. Rail members 92 slidably receive the corresponding rail members 86 on the base 84. Ridge 91 is included along the trailing two sides of the cover 90 to act as a stop and provide additional weatherproofing once the cover 90 is seated against the base 84. The angle of the cover 90 rail members 92 matches the angle of the base 84 rail members 86. For implementations where the electrical device cover assembly is desirable for both horizontal and vertical use orientations, the angle of the rails is between about 40 degrees and about 50 degrees relative to the parallel rectangular sides of the base, which are parallel to the horizontal and vertical mounting orientations. By selecting an angle between about 40 degrees and about 50 degrees, and preferably about 45 degrees, the cover 90 slidably mounted on the base 84 will be most likely to be able to slide closed through the force of gravity on the weight of the cover 84 in both the vertical and horizontal use orientations.

Figure 24A:
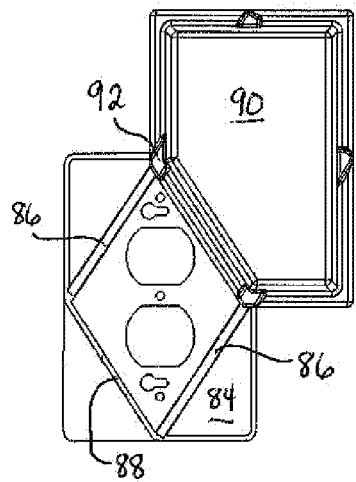
FIGS. 24a and 24b are, respectively, plan and perspective views of the cover assembly illustrated in FIGS. 22a and 23a in a vertical use orientation.
Figure 24B:
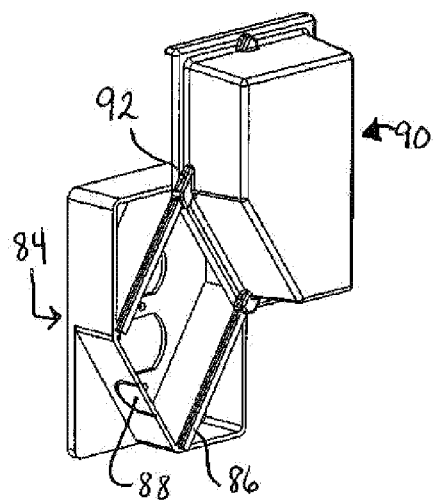

FIGS. 24a and 24b and 26 illustrate, respectively, a plan view and a perspective front view of the electrical device cover assembly shown in FIGS. 22 and 23 with the cover 90 and its rail members 92 slidably mounted to the base 84 and its rail members 86, and oriented for use in the vertical orientation. The cord escape tab 88, attached to the base 84 by a grooved connector, is included on the deep base. Alternatively, the cord escape tab 88 could be included on the cover 90 along the corresponding side of the cover 90. In such implementations, the base may be made shallower.

For each of the implementations shown herein, cord escape tabs may be included within the base if a deeper base is used. For bubble cover implementations, one or more cord escape tabs may be included in the cover if the base is not deep enough. Alternatively, as shown in FIGS. 10 and 11, cord escapes, or cord escapes covered by cord escape tabs, may be included in both the cover and the base. As another less preferred option, it is also contemplated that a spring-biased door be included in the side of a bubble cover implementation to allow for a plug cap or switch extending beyond the plane of the base and pass through the side of the cover when the door opens or closes without leaving a constant opening in the side like that caused by a knockout tab. This design, however, requires additional pieces and production costs and is, therefore, not the most preferred option.

Figure 25A:
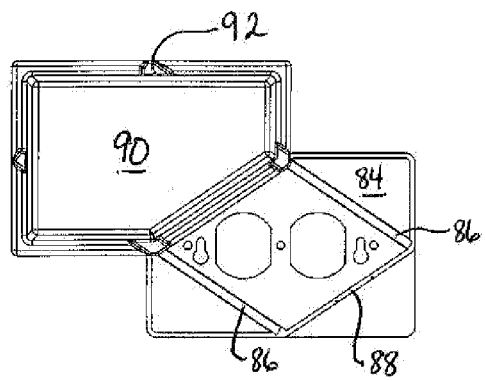
FIGS. 25a and 25b are, respectively, plan and perspective views of the cover assembly illustrated in FIGS. 22a and 23a in a horizontal use orientation.
Figure 25B:
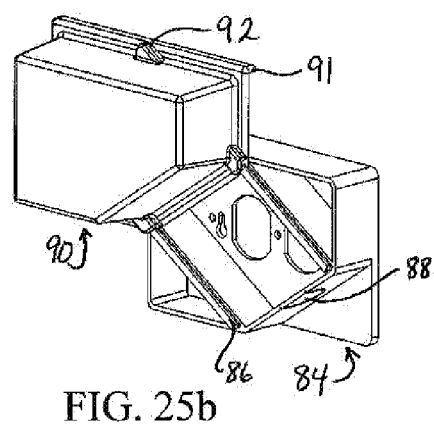

FIGS. 25a and 25b illustrate, respectively, a plan view and a perspective front view of the electrical device cover assembly shown in FIGS. 22 and 23 with the cover 90 and its rail members 92 slidably mounted to the base 84 and its rail members 86, and oriented for use in the horizontal orientation.

An electrical device cover assembly, identical to that shown and described with reference to FIGS. 22-25, may be adapted with a spring bias to cause the cover 96 to be biased closed against the base 94. Sliding rail members of the base 94 and sliding rail members of the cover would guide the cover closed against the base 94 under the bias of spring members coupled to the respective cover and base through spring pins. Although with the angled rail members the spring bias is not required in most cases, having a spring bias may assist in holding the cover more tightly against the base 94, and to close more quickly against the base than without the spring members.

Figure 26A:
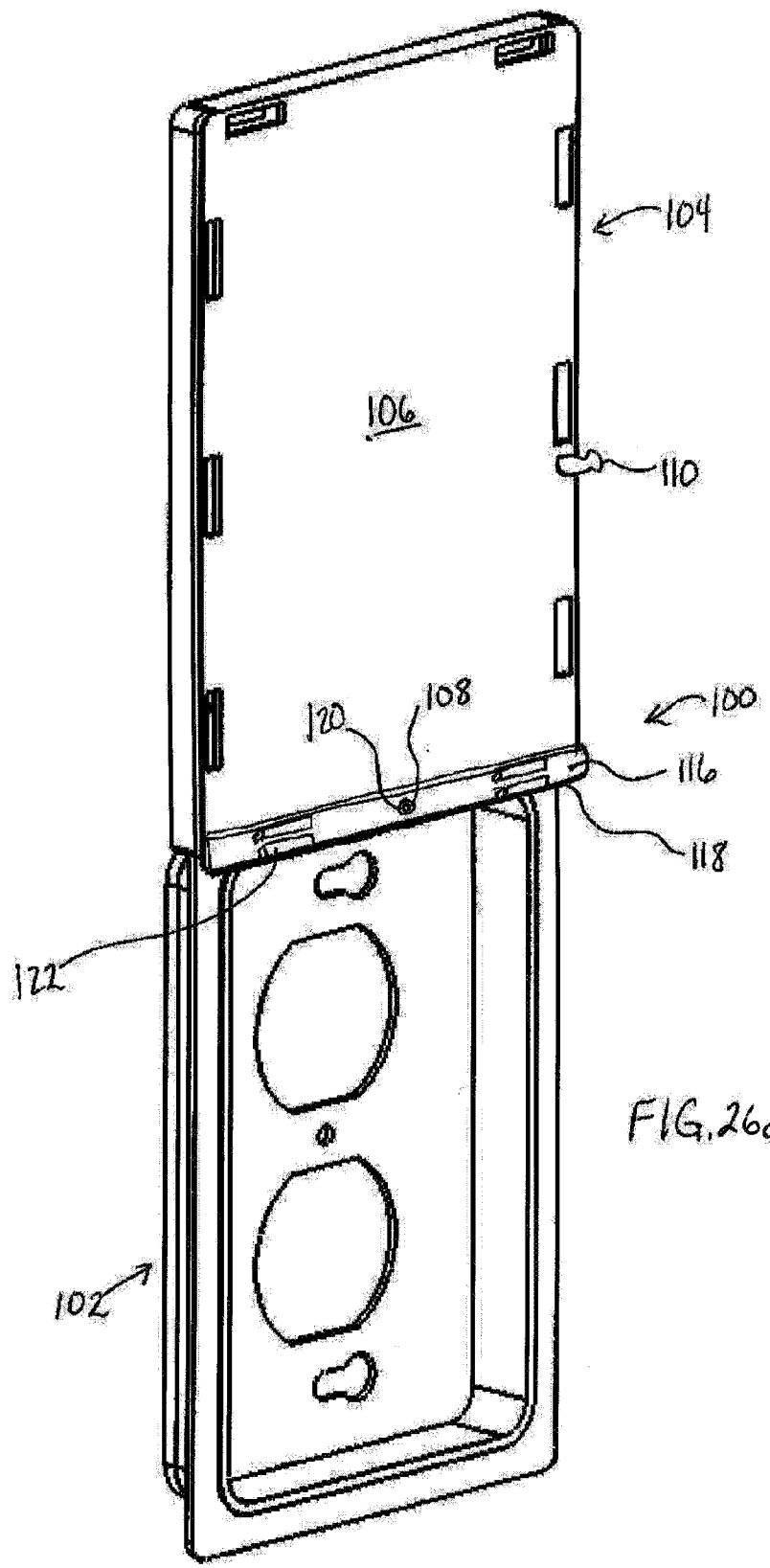
FIGS. 26a and 26b are perspective views of an alternate implementation of an electrical device cover assembly having removable rail members.
Figure 26B:
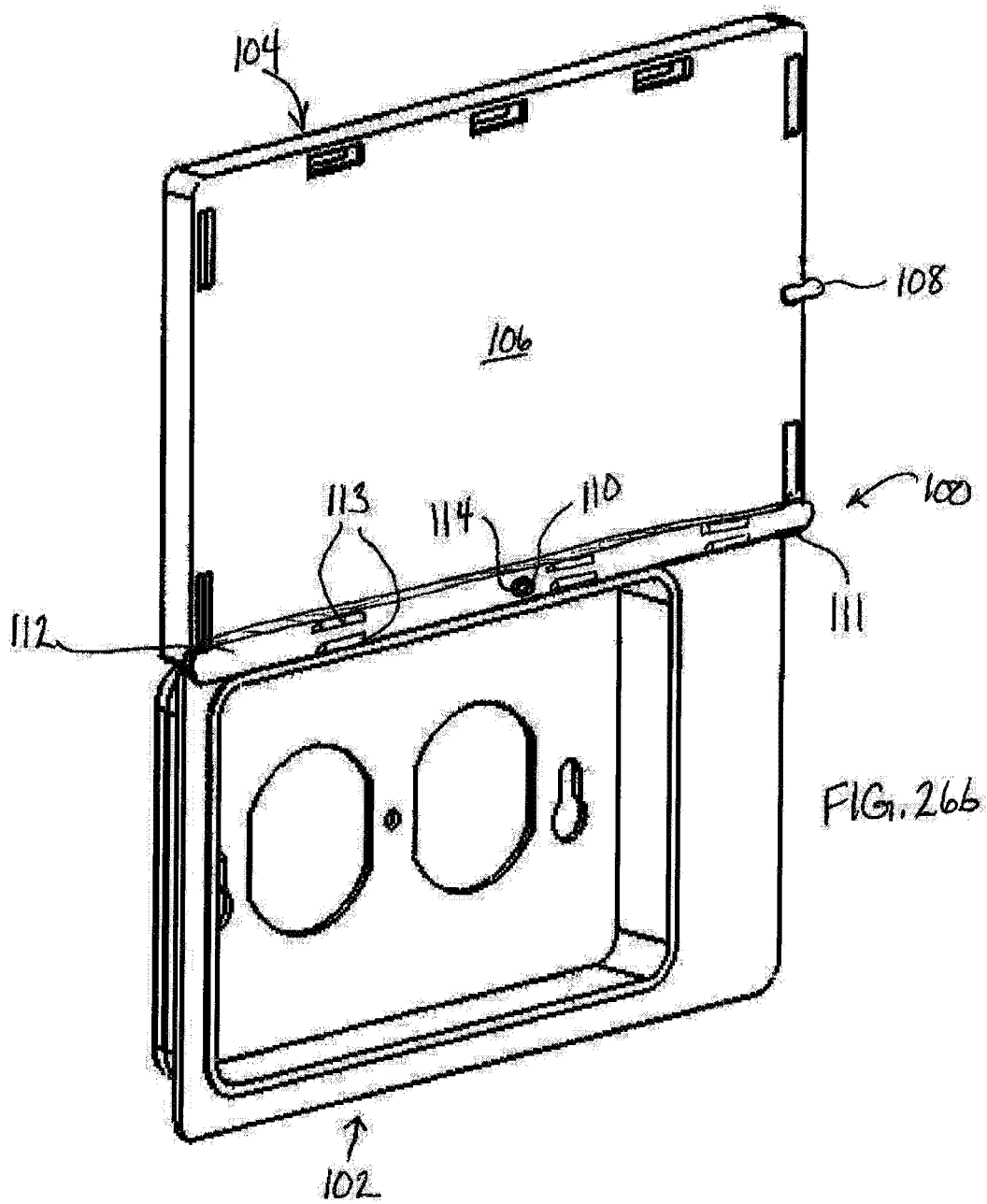

FIGS. 26a and 26b illustrate an alternate implementation for establishing removable rail members 113 and 122 by removing the wall 112 or 116 to which they are attached from its position to a different position. The electrical device cover assembly of FIGS. 26a and 26b each include a base 102, of similar construction to that shown in FIG. 1, and a cover 104. Although two of the walls 112 and 116 of the cover 104 include removable rail members, the walls 112 and 116 remain coupled to the cover 104. Walls 112 and 116 are coupled, respectively, to the cover 104 along their top edges through a "living hinge" material 111 and 118, such as a polypropylene, rubber, or a thin plastic material, that allows the walls 112 and 116 to flex once initially broken free. The sides of the walls 112 and 116 of this implementation are initially attached by grooved connectors to the adjacent wall sides, though other reattachable implementations are also contemplated.

Once an installer selects an intended use orientation, the installer simply snaps off the sides of the appropriate wall 112 or 116 to disconnect it from adjacent walls, and bends the respective living hinge 111 or 118 until the selected wall 112 or 116, and its corresponding receiver 114 or 120, couples with the corresponding pin 108 or 110 to hold the wall out of the way. Accordingly, the rail members 113 or 122 are removed from their interference with the base 102 as it slides into the remaining rail members for either the vertical (FIG. 26a) or horizontal (FIG. 26b) use orientation.

It will be understood that implementations are not limited to the specific components disclosed herein, as virtually any components consistent with the intended operation of a method and/or system implementation for an electrical outlet cover may be utilized. Accordingly, for example, although particular shapes and sizes of electrical outlet cover assembly components may be disclosed, such components may comprise any shape, size, style, type, model, version, class, grade, measurement, concentration, material, weight, quantity, and/or the like consistent with the intended operation of a method and/or system implementation for an electrical outlet cover may be used.

In places where the description above refers to particular implementations of electrical device cover assemblies, it should be readily apparent that a number of modifications may be made without departing from the spirit thereof and that these implementations may be applied to other cover assembly types. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A horizontal and vertical mountable electrical device cover assembly comprising:
   a base;
   a cover;
   a plurality of removable slide rail members coupled to a plurality of side walls of the cover, wherein removal of a first of the plurality of removable slide rail members adapts the assembly for horizontal orientation use with the base and removal of a second of the plurality of removable slide rail members adapts the assembly for vertical orientation use with the base.

2. The cover assembly of claim 1, wherein:
   the base having a first opposing pair of slide rail members and a second opposing pair of base slide rail members;
   the cover having a first opposing pair of cover slide rail and a second opposing pair of cover slide rail members; and
   wherein the first opposing pair of cover slide rail members and the second opposing pair of cover slide rail members each comprises at least one slide rail from the plurality of removable slide rail members.

3. The cover assembly of claim 2, wherein the cover slide rail members and base slide rail members are substantially parallel to a plane defined by a back surface of the base.

4. The cover assembly of claim 2, wherein the cover slide rail members and the base slide rail members are at an angle relative to a plane defined by a back surface of the base.

5. The cover assembly of claim 4, wherein the angle is an arcuate angle.

6. The cover assembly of claim 1, wherein the base is configured to receive a single gang electrical outlet.

7. The cover assembly of claim 1, wherein the base is configured to receive a double gang electrical device.

8. The cover assembly of claim 1, further comprising a gasket positioned between the base and the cover.

9. The cover assembly of claim 1, wherein the cover is a bubble cover.

10. The cover assembly of claim 1, further comprising at least one cord escape tab in the assembly.

11. The cover assembly of claim 1, wherein the plurality of removable slide rail members are coupled to the cover on adjacent sides.

12. The cover assembly of claim 1, wherein the plurality of side walls is coupled to the cover through a grooved connector.

13. The cover assembly of claim 1, wherein the removable slide rail members are coupled to a removable wall coupled to the cover through a living hinge.

14. A method of adapting an electrical device cover assembly for horizontal or vertical orientation use, the method comprising:
   removing at least a first removable rail member from a cover of the assembly to adapt the cover assembly for horizontal orientation use or removing at least a second removable rail member from the cover of the assembly to adapt the cover assembly for vertical orientation use; and
   slidably engaging remaining cover rail members with base rail members to couple the cover to the base.

15. The method of claim 14, wherein slidably engaging remaining cover rail members comprises slidably engaging remaining cover rail members with the base rail members at an angle to a plane defined by a back surface of the base.

16. The method of claim 14, wherein removing the first removable rail member or the second removable rail member comprises bending a living hinge associated with the first removable rail member or the second removable rail member to move the respective rail member away from interference with the sliding engagement of the remaining cover rail members.

17. A horizontal and vertical mountable electrical device cover assembly comprising:
   a base having an opposing pair of parallel base rail members extending across the base at an angle between about 40 and about 50 degrees relative to its mounting orientation;
   a cover having an opposing pair of parallel cover rail members extending across an underside of the cover at an angle to match the angle of the base rail members;
   wherein slideable engagement of the cover rail members and the base rail members configures the slidable cover assembly for horizontal orientation use in a first assembly mounting orientation and for vertical orientation use in a second assembly mounting orientation.

18. The cover assembly of claim 17, further comprising a cord escape tab on a surface between the base rail members.

19. The cover assembly of claim 17, wherein the cover is a bubble cover.

20. The cover assembly of claim 17, wherein the cover slide rail members and base slide rail members are substantially parallel to a plane defined by a back surface of the base.

* * * * *